United States Patent

Markusch et al.

[11] Patent Number: 5,166,303
[45] Date of Patent: Nov. 24, 1992

[54] EXPANDABLE NON-SAGGING POLYURETHANE COMPOSITIONS

[75] Inventors: Peter H. Markusch, McMurray; Jeffrey F. Dormish, Pittsburgh; Hans G. Schmelzer, Pittsburgh; John J. Lindsey, Pittsburgh, all of Pa.

[73] Assignee: Miles Inc., Pittsburgh, Pa.

[21] Appl. No.: 513,466

[22] Filed: Apr. 19, 1990

[51] Int. Cl.$^5$ ............. C08G 18/30; C08G 18/48
[52] U.S. Cl. .................. 528/76; 528/44; 528/60; 528/85
[58] Field of Search ........... 528/76, 60, 46, 44, 528/58, 85, 466, ; 524/144; 521/144, 110; 428/285; 427/266; 260/75 NP, 18 TN, 77.5 A.M.

[56] References Cited

U.S. PATENT DOCUMENTS

| | | | |
|---|---|---|---|
| 4,478,960 | 10/1984 | Buethe et al. | 528/44 |
| 4,695,618 | 9/1987 | Mowrer | 528/76 |
| 4,954,199 | 9/1990 | Rains et al. | 528/85 |

Primary Examiner—John Kight, III
Assistant Examiner—Duc Truong
Attorney, Agent, or Firm—Joseph C. Gil; N. Denise Brown

[57] ABSTRACT

The present invention is directed an expandable, non-sagging polyurethane composition prepared by mixing: a liquid polyisocyanate with a liquid isocyanate reactive mixture. The isocyanate reactive mixture comprises i) one or more hydroxyl group containing compounds containing from 2 to 8 hydroxyl groups and having molecular weights of from about 1000 to about 6000, ii) one or more low molecular weight diols or triols having hydroxyl equivalent weights of about 200 or less, iii) one or more organic di- or polyamines, and iv) a relatively small amount of water.

4 Claims, No Drawings

EXPANDABLE NON-SAGGING POLYURETHANE COMPOSITIONS

BACKGROUND OF THE INVENTION

Adhesive compositions based on polyhydroxyl compounds and polyisocyanates are known. See, e.g., U.S. Pat. Nos. 3,718,518, 3,755,222, 3,812,003, 3,886,122, 3,935,051, and 4,487,909. It is also known to produce adhesive compositions from isocyanate-terminated prepolymers which are moisture curable (see, e.g., U.S. Pat. Nos. 3,779,794, 4,323,491, 4,750,963, and 4,835,012) or which are further reacted with amines (see, e.g., U.S. Pat. Nos. 4,156,064 and 4,336,298).

It is also known to formulate non-sagging polyurethane structural adhesives using primary or secondary amines, polyhydroxyl compounds and polyisocyanates. See, e.g., U.S. Pat. Nos. 3,714,127, 3,979,364, 4,444,976, 4,552,934, 4,728,710, and 4,743,672, and U.S. application Ser. No. 07/076,951 filed on Jul. 23, 1987. Upon cure, such non-sagging compositions show a high degree of contraction (i.e., shrinkage). When used to bond or repair plastic parts, this can result in deformation of the plastic part. In the case of solid substrates, e.g., a crack in concrete, contraction of the adhesive composition may lead to disbonding on the interface or formation of cracks. One way to solve this problem has been to use high amounts of inorganic fillers such as calcium carbonate, talc, barium sulfate and the like. These filled systems, however, are usually highly viscous and difficult to mix and to pump. Additionally, the fillers must be carefully dried before use to avoid foaming which would result in a weakening of the adhesive bond. The problems associated with manufacturing non-sagging polyurethane adhesives are described, e.g., in U.S. Pat. Nos. 3,755,222, 3,886,122, 3,935,051, 4,444,976 and 4,728,710.

It is known that polyurethane compositions can be used to seal and strengthen water-bearing geological formations. See, e.g., U.S. Pat. No. 4,454,252.

Polyurethane compositions which cure in the presence of moisture with an increase in volume have been described in U.S. Pat. No. 4,489,176. The compositions described consist broadly of an isocyanate terminated prepolymer, a foam stabilizer, and diluents. The diluents described are organic solvents and include fluorochlorocarbons.

DESCRIPTION OF THE INVENTION

It has now been found that two component polyurethane compositions can be formulated from low viscosity materials which do not require a filler and which after mixing form a non-sagging composition which expands slightly upon cure. More particularly, the present invention is directed to an expandable, non-sagging polyurethane composition prepared by mixing;

a) a liquid polyisocyanate having an isocyanate group content of from about 10% by weight to about 50% by weight, and preferably from about 15% by weight to about 35% by weight, with
b) a liquid isocyanate reactive mixture comprising:
   i) from 40 to 95 parts by weight, and preferably from 55 to 80 parts by weight, of one or more hydroxyl group containing compounds containing from 2 to 8 hydroxyl groups and having a molecular weight of from about 1000 to about 6000.
   ii) from 2 to 50 parts by weight, and preferably from 15 to 35 parts by weight, of one or more low molecular weight diols or triols having hydroxyl equivalent weights of about 200 or less,
   iii) from 1 to 10 parts by weight, and preferably from 3 to 6 parts by weight, of one or more organic di- or polyamines, and
   iv) from 0.1 to 2.0 parts by weight, and preferably from 0.2 to 1.0 parts by weight, of water, wherein said parts by weight total 100, and wherein the amounts of component a) and component b) are such that the equivalent ratio of isocyanate groups to hydroxyl and amine groups is from 0.8:1 to 2:1, and preferably from 1:1 to 1.5:1.

The exact amount of water used depends upon the total formulation, but is chosen to generate a volume increase of the composition upon cure of at least 2% and no more than about 200%.

The compositions herein are specifically suited to bond irregular shaped surfaces and to repair cracks and voids. If they are used to repair plastic parts or composites (e.g., on automobiles) where sanding may be required, it is generally preferred to include glass fillers, such as microballoons, in the compositions.

The isocyanates useful herein are known. They are liquid polyisocyanates having isocyanate group contents of from about 10 to about 50% by weight, and preferably from 15 to 35% by weight. It is generally preferred that the isocyanates used have a viscosity of less than 15,000 mPas at 25° C. It is also preferred that the isocyanate used be non volatile at ambient temperature. Typically, useful isocyanates will have vapor pressures at 25° C. of less than 0.05 mm Hg or boiling points of more than 130° C. at 10 mm Hg. The presently preferred isocyanates are polymethylene poly(phenyl isocyanates) having NCO contents of from 15 to 32% by weight, and viscosities of from 40 to 3,000 mPas at 25° C., and liquid adducts of such isocyanates with polyols.

The liquid isocyanate reactive mixture useful herein contains i) a relatively high molecular weight polyol, ii) a relatively low molecular weight diol or triol, iii) an organic di- or polyamine, and iv) water.

The relatively high molecular weight polyol must have a molecular weight of from about 1000 to about 6000 and contains from 2 to 8 hydroxyl groups. Such polyols are generally known in the polyurethane art and include polyethers, polyesters, polyester amides and polycarbonates. Polyether polyols are generally preferred. As is known in the art, polyether polyols are generally alkylene oxide adducts of diols, triols, and higher functionality polyols, amines and aminoalcohols. The alkylene oxide may suitably be ethylene oxide, 1,2-propylene oxide or 1,2-butylene oxide or a mixture of some of all of these.

Among the useful polyether polyols are the so-called PHD polyols which are prepared by reacting an organic diisocyanate and hydrazine in the presence of a polyether polyol. See, e.g., U.S. Pat. Nos. 3,325,421, 4,042,537 and 4,089,835. Also suitable are the so-called polymer polyols which are prepared by polymerizing styrene and carylonitrile in the presence of a polyether. These have been disclosed in U.S. Pat. Nos. 3,383,351, 3,304,273, 3,523,093, 3,652,639, 3,823,201 and 4,390,645.

Polyester amide polyols are known in the art and include the predominantly linear condensates obtained from polyvalent saturated and unsaturated carboxylic acids or their anhydrides and polyhydric saturated and unsaturated amines, alcohols, diamines, polyamines and mixtures thereof.

Suitable polycarbonate polyols include those which may be obtained by reacting diols such as 1,3-propane diol, 1,4-butane diol and/or 1,6-hexane diol, diethylene glycol, triethylene glycol and tetraethylene glycol with diaryl carbonate (such as diphenyl carbonate) or phosgene.

The polyester polyols useful herein are known in the art. It will however be understood that the term includes chain extended polyesters made from a glycol (e.g., ethylene and/or propylene glycol) and a saturated dicarboxylic acid (e.g. adipic acid as well as polycaprolactone diols). Other polyester polyols inlcude poly(ethylene adipate) glycol, poly(propylene adipate) glycol, poly(butylene adipate) glycol, poly(neopentyl sebacate) glycol, etc. Also, suitable polyester polyols include those obtainable by reacting such polyols as 1,4-butanediol, hydroquinone bis(2-hydroxyethyl)ether, ethylene glycol, diethylene glycol, triethylene glycol, propylene glycol, dipropylene glycol, 2-methyl-2-ethyl-1,3-propanediol, 2-ethyl-1,3-hexanediol, 1,5-pentanediol, thiodiglycol, 1,3-propanediol, 1,3-butanediol, 2,3-butanediol, neopentyl glycol, 1,2-dimethyl-1,2-cyclopentanediol, 1,2-cyclohexanediol, 1,2-dimethyl-1,2-cyclohexanediol, glycerol, trimethylol propane, trimethylol ethane, 1,2,4-butanetriol, 1,2,6-hexanetriol, pentaerythritol, dipentaerythritol, tripentaerythritol, mannitol, sorbitol, methyl-glycoside, and the like with such dicarboxylic acids as adipic acid, succinic acid, glutaric acid, azelaic acid, sebacic acid, malonic acid, maleic acid, fumaric acid, phthalic acid, isophthalic acid, terephthalic acid, tetrachlorophthalic acid and chlorendic acid; the acid anhydrides and acid halides of these acids may also be used.

The organic di- and polyamines useful herein are also known and are described, e.g., in U.S. Pat. Nos. 3,714,127, 3,979,364, 4,444,976, 4,552,934, 4,728,710, and 4,743,672, the disclosures of which are hereby incorporated by reference. Such amines typically have molecular weights of at least 60 and include aliphatic, aromatic and cycloaliphatic diamines and triamines, preferably aromatic or cycloaliphatic diamines. Particularly preferred are isophorone diamine, methylene bis(cyclohexyl amine) and diethyl toluene diamine. Other preferred amines include diethylene triamine, 1-methyl-3,5-diethyl-2,4-diaminobenzene and/or its mixture with up to 35 percent by weight, based on the mixture of 1-methyl-3,5-diethyl-2,6-diaminobenzene.

The relatively low molecular weight diols and triols useful herein are known in the polyurethane art. They are generally aliphatic diols and triols having equivalent weights of 200 or less. Specific examples include ethylene glycol, propylene glycol, 1,3-dihydroxypropane, 1,4-dihydroxy-butane, 1,6-dihydroxyhexane, glycerine, trimethylol propane and low molecular weight ethoxylation and/or porpoxylation products of such diols and triols.

The expandable, non-sagging polyurethane compositions of the invention may optionally include catalysts. These include the conventional polyurethane catalysts, preferably tin catalysts and tertiary amine catalysts.

Suitable organic tin compounds include tin-(II) salts of carboxylic acids such as tin acetate, tin octoate, tin 2-ethylhexanoate and tin laurate, and the tin-(IV)-compounds such as dibutyl tin oxide, dibutyl tin dichloride, dibutyl tin diacetate, dibutyl tin dilaurate, and dibutyl tin maleate or dibutyl tin diacetate.

Preferred tin catalysts include sulphur containing tin compounds such as di-(octyl)-tin-(IV)-bis-thiomethyl or dimethyl tin-(IV)-bis-thiolauryl; dimethyltinbisthioglycolic acid hexyl ester; or dibutyl tin-bis-thioglycolic acid octyl ester. The above-mentioned catalysts can obviously be used as mixtures. Combinations of organic metal compounds with amino pyridines, hydrazino pyridines (German Auslegeschriften No. 2,434,185, 2,601,082 and 2,603,834) or 1,4-diazabicyclo-2,2,2-octane and/or conventional tertiary amine catalysts of the type usually used in polyurethane chemistry can also be used if desired. The catalysts when used are generally used in a quantity of 0.001 to 5% by weight, preferably 0.01 to 2% by weight based on the weight of all the components. The use of a catalyst brings about a shortening of the handling time of the adhesive system.

The components can be mixed in any way, e.g., by stirring them together, by combining them in a mixhead, or the like. In field repairs, however, it is possible to store the materials using a cartridge with a membrane separating the two components and a plunger to break the membrane for the application of the compositions. Another simple way is to store premeasured amounts of the reactants in plastic bags and, when ready to use, to combine them in a plastic bag and mix them by kneading the bag. After mixing is complete, the material can be applied by squeezing it out of a hole made by cutting off a corner of the plastic bag.

The invention is further illustrated, but is not intended to be limited by the following examples in which all parts and percentages are by weight unless otherwise specified.

EXAMPLES

A urethane modified isocyanate was prepared by reacting 90.1 parts of a polymethylenepoly(phenyl isocyanate) having an isocyanate group content of 32% by weight and an average isocyanate functionality of 2.8, with 18.5 parts of a 1000 molecular weight polyoxypropylene diol (the initiator used to produce this diol was propylene glycol). The resultant isocyanate had an isocyanate group content of 25% by weight.

In each of the examples which follow, the isocyanate was mixed with the polyol components noted in Table 1 at an equivalent ratio of isocyanate groups to hydroxyl and amine groups of 1.20. The product was either cured at 120° C. for thirty minutes or cured at room temperature for 24 hours. The degree of foaming was determined by the decrease in the density of the sample relative to a sample that did not exhibit foaming.

The polyol blend was prepared and was used in each of the subsequent examples to show the effect of water content on the degree of foaming. The blend (referred to as "BLEND") was prepared from 56.5 parts of the same polyoxypropylene diol used to prepare the urethane modified isocyanate, 25 parts of a 455 molecular weight polyoxypropylene triol (the initiator used to prepare this triol was trimethylolpropane), 10 parts of 1,4-butane diol, 4 parts of isophorone diamine, and 0.1 parts of diethylene triamine. BLEND had a water content of 0.10% by weight.

EXAMPLE 1

10 parts of sodium potassium aluminosilicate in castor oil were added to 95.6 parts of BLEND and 0.18 parts of water to produce a polyol mixture with no foaming tendency. The sodium potassium aluminosilicate acted as a water scavenger and prevented any water induced foaming from occurring.

EXAMPLE 2

95.6 parts of BLEND were dewatered under vacuum to yield a polyol mixture with a water content of >0.05%.

EXAMPLE 3

BLEND was used as prepared.

EXAMPLE 4

0.09 parts of water were added to 95.6 parts of BLEND to yield a polyol mixture with a water content of 0.2%.

EXAMPLE 5

0.18 parts of water were added to 95.6 parts of BLEND to yield a polyol mixture with a water content of 0.3%.

EXAMPLE 6

0.47 parts of water were added to 95.6 parts of BLEND to yield a polyol mixture with a water content of 0.6%.

EXAMPLE 7

0.91 parts of water were added to 95.6 parts of BLEND to yield a polyol mixture with a water content of 1.1%.

EXAMPLE 8

1.81 parts of water were added to 95.6 parts of BLEND to yield a polyol mixture with a water content of 2.0%.

The results of the various examples were as noted in Table 1 below:

TABLE 1

| POLYOL | % WATER | 120 CURE | | R.T. CURE | |
|---|---|---|---|---|---|
| | | DENSITY, g/ml | % VOL INCREASE | DENSITY, g/ml | % VOL INCREASE |
| Example 1 | 0.2 | 1.17 | 0 | 1.17 | 0 |
| Example 2 | <0.05 | 0.93 | 25 | 1.12 | 4 |
| Example 3 | 0.1 | 0.63 | 85 | 0.81 | 45 |
| Example 4 | 0.2 | 0.61 | 92 | 0.69 | 70 |
| Example 5 | 0.3 | 0.58 | 100 | 0.74 | 58 |
| Example 6 | 0.6 | 0.61 | 91 | 0.64 | 83 |
| Example 7 | 1.1 | 0.52 | 125 | 0.56 | 110 |
| Example 8 | 2.0 | 0.41 | 185 | 0.53 | 120 |

Although the invention has been described in detail in the foregoing for the purpose of illustration, it is to be understood that such detail is solely for that purpose and the variations can be made therein by those skilled in the art without departing from the spirit and scope of the invention except as it may be limited by the claims.

What is claimed is:

1. An expandable, non-sagging polyurethane composition prepared by mixing:
   a) a liquid polyisocyanate having an isocyanate group content of from about 10% by weight to about 50% by weight, with
   b) a liquid isocyanate reactive mixture comprising:
      i) from 40 to 95 parts by weight of one or more hydroxyl group containing compounds containing from 2 to 8 hydroxyl groups and having molecular weights of from about 1000 to about 6000,
      ii) from 2 to 50 parts by weight of one or more low molecular weight diols or triols having hydroxyl equivalent weight of about 200 or less,
      iii) from 1 to 10 parts by weight of one or more organic di- or polyamines, and
      iv) from 0.1 to 2.0 parts by weight of water,
   wherein said parts by weight total 100, and wherein the amount of component a) and component b) are such that the equivalent ratio of isocyanate groups to hydroxyl and amine groups is from 0.8:1 to 2:1.

2. The composition of claim 1, wherein said liquid polyisocyanate has an isocyanate group content of from about 15 to about 35% by weight.

3. The composition of claim 1, wherein component b)i) comprises from 55 to 80 parts by weight, component b)ii) comprises from 15 to 35 parts by weight, component b)iii) comprises from 3 to 6 parts by weight, and component b)iv) comprises from 0.2 to 1.0 parts by weight.

4. The composition of claim 1, wherein said equivalent ratio is from 1:1 to 1.5:1.

* * * * *